H. F. BROCKMAN.
RAKE CLEANING DEVICE.
APPLICATION FILED APR. 23, 1918.
1,305,874.
Patented June 3, 1919.
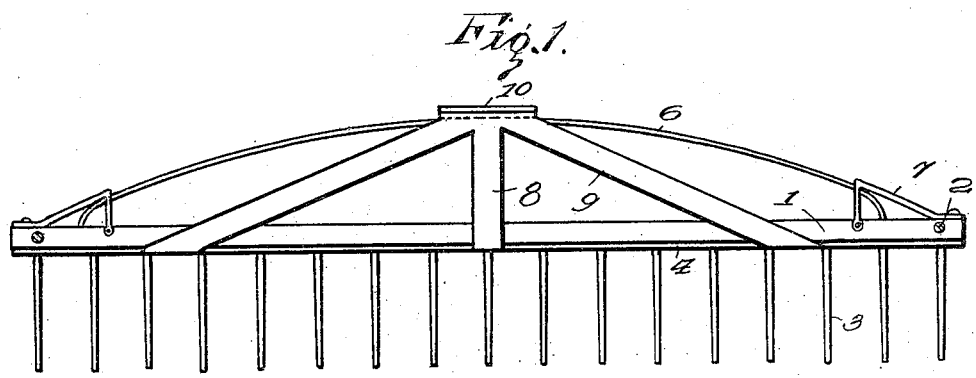
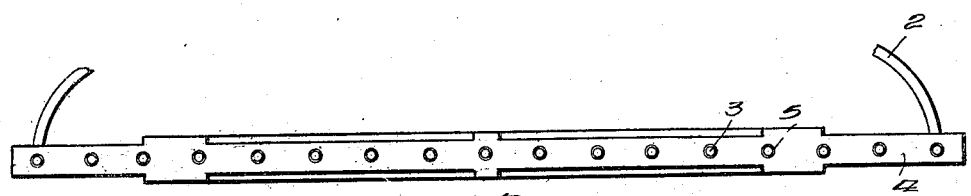
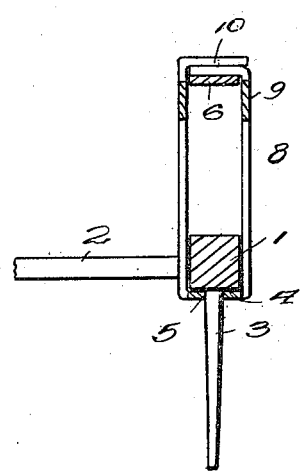
Henry F. Brockman
Inventor
By Geo. P. Kimmel
Attorney

UNITED STATES PATENT OFFICE.

HENRY F. BROCKMAN, OF LINCOLN, CALIFORNIA.

RAKE-CLEANING DEVICE.

1,305,874.  Specification of Letters Patent.  Patented June 3, 1919.

Application filed April 23, 1918. Serial No. 230,274.

*To all whom it may concern:*

Be it known that I, HENRY F. BROCKMAN, a citizen of the United States, residing at Lincoln, in the county of Placer and State of California, have invented certain new and useful Improvements in Rake-Cleaning Devices, of which the following is a specification.

This invention relates to new and useful improvements in rakes, and more particularly the device comprises an attachment adapted to be applied to the conventional type of garden rake, whereby, when necessary, the teeth thereof may be cleaned by moving a normally inoperative cleaner bar along the same so as to remove any rubbish that may have collected thereon.

Another object of the invention is to provide a device of this character which is simply constructed, and which is adapted to be applied to the conventional type of garden rake with very little trouble, and no material change to the structure thereof.

A further object of the invention is to provide a device of this character which is easily and simply constructed, inexpensive to manufacture, and one which will be very efficient in operation.

With these and numerous other objects in view, my invention consists of the novel features of construction, combination and arrangement of parts, which will be herein referred to and more particularly pointed out in the specification and claim.

In the accompanying drawings:

Figure 1 is a front elevation of the attachment applied to a rake head.

Fig. 2 is a bottom plan view thereof, and

Fig. 3 is a vertical transverse section through the attachment.

In describing my invention I shall refer to the drawings in which similar reference characters designate corresponding parts throughout the several views.

The numeral 1 designates the conventional type of rake head, which is provided with the usual type of bow 2 having its extremities connected adjacent the ends of the rake head at one side thereof, said bow having the usual type of handle, not shown, connected therewith. The rake head 1 has a plurality of depending teeth 3, that are secured in the lower side thereof.

Disposed adjacent the lower side of the rake head 1 is a correspondingly sized cleaner bar 4, that extends longitudinally thereon, and which has a plurality of longitudinally spaced apertures 5 therein that are slidably mounted on the teeth 3. The cleaner bar 4 is normally positioned adjacent the lower face of the head of the rake, as is clearly shown in Figs. 1 and 3 of the drawings.

Connected with the top of the head 1 of the rake is a bowed spring 6, which has its extremities slidably mounted in brackets 7 that connect the same with the head of the rake adjacent its opposite ends. Projecting from opposite sides of the cleaner bar 4 are braces, which are formed integral therewith, said braces comprising upright center braces 8, and convergent end braces 9, that project around the head adjacent the opposite sides thereof, and which are joined together at their upper ends and provided with inwardly extending and overlapping connected portions 10, that are positioned over the bowed spring 6, at a point midway the ends thereof. These overlapping portions may be secured together by any desired means, so that they are connected above the bowed spring 6.

In operation when it is desired to clean the teeth 3 of the rake, the bowed spring is pressed downwardly toward the head 1, causing the extremities thereof to project outwardly through the brackets 7, and consequently throwing the braces of the bar 4 downwardly with the spring, so that the bar 4 is projected outwardly along the teeth 3. This will serve to clean the teeth of any rubbish that has collected thereon, and upon releasing the spring 6 the bar 4 will be returned to normal inoperative position adjacent the lower face of the rake head.

This cleaning device is very easily constructed, and may be easily attached to the conventional type of garden rake. The cleaning bar, and side portions are preferably all formed integral, as are the projecting overlapping connected portions 10 at the junction of the side braces of the device, thereby permitting all of these parts to be formed from a single blank. This device may be very economically manufactured, owing to the small number of parts used, and the novel arrangement will efficiently carry out the cleaning of the rake head 1 when the device is operated. The operation is easily accomplished by reversing the head of the rake, and striking the spring 6 on the ground or a fence post whereby the bar will be projected outwardly to clean the teeth.

From the foregoing description taken in connection with the accompanying drawings, it is thought that a clear and comprehensive understanding of the construction, operation and advantages of my invention may be had, and while I have shown and described the device as embodying a specific structure, I desire it to be understood that such changes may be made in said structure as do not depart from the spirit and scope of the invention as claimed.

Having fully described my invention, what I claim as new and desire to secure by Letters Patent is:

The combination with a rake head having a plurality of depending teeth, of a cleaning bar provided with a longitudinal series of teeth engaging openings, central upright and convergent end braces integral with the opposite side edges of the cleaning bar and having their upper ends joined together, inwardly extending and overlapping flanges extending from the upper ends of the braces and connected together, brackets mounted at the ends of the head, and a bowed spring arranged above the head between the braces having its end portion slidably mounted in the brackets and its medial portion bearing against the under surface of one of the flanges and tensioned to normally hold the cleaning bar in yielding contact with the under surface of the head.

In testimony whereof, I affix my signature hereto.

HENRY F. BROCKMAN.

Copies of this patent may be obtained for five cents each, by addressing the "Commissioner of Patents, Washington, D. C."